(12) United States Patent
Yamada et al.

(10) Patent No.: US 12,235,027 B2
(45) Date of Patent: Feb. 25, 2025

(54) REFRIGERANT CHARGING METHOD

(71) Applicant: DAIKIN INDUSTRIES, LTD., Osaka (JP)

(72) Inventors: Takuro Yamada, Osaka (JP); Atsushi Yoshimi, Osaka (JP); Eiji Kumakura, Osaka (JP); Ikuhiro Iwata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 651 days.

(21) Appl. No.: 17/280,806

(22) PCT Filed: Sep. 20, 2019

(86) PCT No.: PCT/JP2019/037048
§ 371 (c)(1),
(2) Date: Mar. 26, 2021

(87) PCT Pub. No.: WO2020/066921
PCT Pub. Date: Apr. 2, 2020

(65) Prior Publication Data
US 2022/0003470 A1 Jan. 6, 2022

(30) Foreign Application Priority Data
Sep. 28, 2018 (JP) .................................. 2018-184329
Sep. 28, 2018 (JP) .................................. 2018-184330
(Continued)

(51) Int. Cl.
*F25B 45/00* (2006.01)
*F25B 13/00* (2006.01)
(Continued)

(52) U.S. Cl.
CPC .............. *F25B 45/00* (2013.01); *F25B 13/00* (2013.01); *F25B 49/02* (2013.01); *F25B 40/00* (2013.01);
(Continued)

(58) Field of Classification Search
CPC ................ F25B 45/00; F25B 2345/001; F25B 2345/003
See application file for complete search history.

(56) References Cited

U.S. PATENT DOCUMENTS

| 4,441,330 A | * | 4/1984 | Lower | ..................... F25B 45/00 62/149 |
|---|---|---|---|---|
| 5,927,087 A | | 7/1999 | Ishikawa | |

(Continued)

FOREIGN PATENT DOCUMENTS

| CN | 101691963 A | 4/2010 |
|---|---|---|
| CN | 102032732 A | 4/2011 |

(Continued)

OTHER PUBLICATIONS

International Preliminary Report on Patentability and English translation of the Written Opinion of the International Searching Authority, for International Application No. PCT/JP2019/037048, dated Apr. 8, 2021.

(Continued)

*Primary Examiner* — Lionel Nouketcha
(74) *Attorney, Agent, or Firm* — Birch, Stewart, Kolasch & Birch, LLP

(57) ABSTRACT

Efficiency in refrigerant charging work is addressed when a refrigerant recovered from the first heat source unit is to be charged to a second heat source unit. In a refrigerant charging method in which a first heat source unit of an already installed refrigeration cycle apparatus in which a refrigeration cycle is to be performed by a refrigerant that (Continued)

circulates is replaced with a second heat source unit, transferring the refrigerant from the first heat source unit to the second heat source unit is included. In addition, the method includes measuring the weight of the refrigerant that is transferred from the first heat source unit to the second heat source unit.

17 Claims, 10 Drawing Sheets

(30) Foreign Application Priority Data

Sep. 28, 2018 (JP) ................................. 2018-184331
Sep. 28, 2018 (JP) ................................. 2018-184332

(51) Int. Cl.
  *F25B 43/00* (2006.01)
  *F25B 49/02* (2006.01)
  *F25B 40/00* (2006.01)
  *F25B 41/24* (2021.01)

(52) U.S. Cl.
  CPC ............. *F25B 41/24* (2021.01); *F25B 43/003* (2013.01); *F25B 2313/0233* (2013.01); *F25B 2345/001* (2013.01); *F25B 2345/003* (2013.01); *F25B 2345/007* (2013.01); *F25B 2400/12* (2013.01); *F25B 2400/19* (2013.01); *F25B 2500/221* (2013.01); *F25B 2600/2513* (2013.01)

(56) References Cited

U.S. PATENT DOCUMENTS

| | | | |
|---|---|---|---|
| 6,035,648 | A | 3/2000 | Hickman et al. |
| 6,196,008 | B1 | 3/2001 | Fujitaka et al. |
| 6,425,252 | B1 | 7/2002 | Kobayashi et al. |
| 9,759,464 | B2 * | 9/2017 | Sanhaji ................ F25B 43/043 |
| 2003/0213256 | A1 * | 11/2003 | Ueda ........................ F25B 1/02 62/230 |
| 2004/0055317 | A1 | 3/2004 | Nomura et al. |
| 2005/0081606 | A1 | 4/2005 | Taira |
| 2008/0230738 | A1 | 9/2008 | Minor et al. |
| 2011/0219794 | A1 | 9/2011 | Shiba |
| 2012/0291457 | A1 * | 11/2012 | Brown ................... F25B 45/00 62/77 |
| 2014/0216076 | A1 | 8/2014 | Yamashita |
| 2014/0260352 | A1 | 9/2014 | Murray |
| 2015/0159930 | A1 * | 6/2015 | McMasters ............ F25B 45/00 62/149 |
| 2015/0338136 | A1 | 11/2015 | Suzuki |
| 2016/0084556 | A1 | 3/2016 | Kato et al. |
| 2016/0130490 | A1 | 5/2016 | Kujak et al. |
| 2018/0172329 | A1 | 6/2018 | Taira |
| 2019/0003755 | A1 | 1/2019 | Crombie et al. |

FOREIGN PATENT DOCUMENTS

| | | |
|---|---|---|
| CN | 104019525 A | 9/2014 |
| EP | 0 715 134 A2 | 6/1996 |
| EP | 0 789 199 A2 | 8/1997 |
| EP | 2 602 572 A1 | 6/2013 |
| EP | 2 698 585 A1 | 2/2014 |
| EP | 3 012 555 A1 | 4/2016 |
| JP | 63-129273 A | 6/1988 |
| JP | 2-157573 A | 6/1990 |
| JP | 4-273957 A | 9/1992 |
| JP | 6-341737 A | 12/1994 |
| JP | 8-121881 A | 5/1996 |
| JP | 8-145515 A | 6/1996 |
| JP | 8-296908 A | 11/1996 |
| JP | 8-303911 A | 11/1996 |
| JP | 8-327168 A | 12/1996 |
| JP | 9-72637 A | 3/1997 |
| JP | 9-113044 A | 5/1997 |
| JP | 9-217970 A | 8/1997 |
| JP | 10-311625 A | 11/1998 |
| JP | 11-173709 A | 7/1999 |
| JP | 11-201849 A | 7/1999 |
| JP | 2000-199660 A | 7/2000 |
| JP | 3360575 B2 | 12/2002 |
| JP | 2003-240388 A | 8/2003 |
| JP | 2004-12126 A | 1/2004 |
| JP | 2004-116875 A | 4/2004 |
| JP | 2004116885 A * | 4/2004 |
| JP | 2004-232951 A | 8/2004 |
| JP | 2005-127542 A | 5/2005 |
| JP | 2006-46446 A | 2/2006 |
| JP | 2006-207925 A | 8/2006 |
| JP | 2007-127325 A | 5/2007 |
| JP | 2008-202909 A | 9/2008 |
| JP | 2008-256254 A | 10/2008 |
| JP | 2009-222356 A | 10/2009 |
| JP | 2011-47556 A | 3/2011 |
| JP | 2011-94871 A | 5/2011 |
| JP | 2012-225525 A | 11/2012 |
| JP | WO2013/111180 A1 | 8/2013 |
| JP | 2014-77594 A | 5/2014 |
| JP | 2014-202451 A | 10/2014 |
| JP | 2015-14372 A | 1/2015 |
| JP | 5934482 B2 | 6/2016 |
| JP | 2017-32185 A | 2/2017 |
| JP | 2017-67383 A | 4/2017 |
| JP | 2017-141998 A | 8/2017 |
| JP | 2017-215140 A | 12/2017 |
| JP | 2018-501334 A | 1/2018 |
| KR | 10-1727540 B1 | 4/2017 |
| WO | WO2014/196045 A1 | 12/2014 |
| WO | WO 2014/203355 A1 | 12/2014 |
| WO | WO 2017/027716 A1 | 2/2017 |
| WO | WO 2018/146719 A1 | 8/2018 |

OTHER PUBLICATIONS

International Search Report for PCT/JP2019/037048 (PCT/ISA/210) mailed on Oct. 29, 2019.
Extended European Search Report for European Application No. 19865088.9, dated Oct. 11, 2021.
Extended European Search Report for European Application No. 19865862.7, dated Oct. 5, 2021.
Extended European Search Report for European Application No. 19867372.5. dated Oct. 11, 2021.
Extended European Search Report for European Application No. 19868034.0, dated Oct. 11, 2021.

* cited by examiner

REFRIGERANT CHARGING METHOD

TECHNICAL FIELD

The present disclosure relates to a refrigerant charging method for a refrigeration cycle apparatus in which a refrigeration cycle is to be performed by a refrigerant that circulates.

BACKGROUND ART

A refrigeration cycle apparatus including a refrigerant circuit in which a refrigeration cycle is to be performed is applied to an air conditioning apparatus, a boiler, and the like. As described in, for example, PTL 1 (Japanese Unexamined Patent Application Publication No. 2003-240388), for a refrigeration cycle apparatus, an already installed pipe may be utilized in charging of a refrigerant to the refrigeration cycle apparatus. In the refrigeration cycle apparatus described in PTL 1, for example, a liquid refrigerant is collected and recovered in an outdoor heat exchanger of a heat source unit through pump down operation. Usually, the refrigerant recovered from the refrigerant cycle apparatus is carried to a factory and discarded or carried to a factory and regenerated.

SUMMARY OF INVENTION

Technical Problem

Taking a refrigerant recovered from an already installed refrigeration cycle apparatus back to a factory and regenerating the refrigerant, however, require transporting the recovered refrigerant from a location where the already installed refrigeration cycle apparatus is present to the factory. In addition, the refrigerant regenerated in the factory is required to be transported from the factory to a location where a refrigeration cycle apparatus that is an object of refrigerant charging is present.

Regeneration utilization in which a refrigerant is thus taken back to a factory and regenerated has a problem that efficiency in refrigerant charging work is degraded.

Solution to Problem

A refrigerant charging method according to a first aspect is a refrigerant charging method of recovering a refrigerant in order to charge the refrigerant to a second heat source unit, the refrigerant being included in a first heat source unit of an already installed refrigeration cycle apparatus in which a refrigeration cycle is to be performed by the refrigerant that circulates, and of charging the refrigerant to the second heat source unit, the method including: a step (a) of transferring the refrigerant from the first heat source unit to the second heat source unit; and a step (b) of measuring a weight of the refrigerant that is transferred from the first heat source unit to the second heat source unit.

In the refrigerant charging method according to the first aspect, the weight of the refrigerant that is transferred from the first heat source unit to the second heat source unit is measured, and, thus, the weight of a recovered refrigerant from the first heat source unit that can charge the refrigerant again to the second heat source unit is known. It is possible to precisely know the weight of the refrigerant lacking in the second heat source unit, and it is possible to charge a proper amount of the refrigerant to the second heat source unit. As a result, the recovered refrigerant can be charged efficiently, not via a factory and the like, from the first heat source unit to the second heat source unit. The refrigerant that is to be recovered and charged means a refrigerant that is recovered from the first heat source unit A refrigerant charging method according to a second aspect is the refrigerant charging method according to the first aspect, in which, in the step (b), the weight of the refrigerant that is transferred from the first heat source unit to the second heat source unit is measured by using a scale that measures a weight of a recovery cylinder in which the refrigerant has been recovered from the first heat source unit.

In the refrigerant charging method according to the second aspect, the weight of the refrigerant is measured by the scale from the weight of the recovery cylinder in which the refrigerant has been recovered from the first heat source unit, and it is thus possible to measure the weight of the recovery cylinder that is, for example, before and after the refrigerant is charged from the recovery cylinder to the second heat source unit. As a result, it is possible to precisely measure the amount of the refrigerant that is transferred from the first heat source unit to the second heat source unit via the recovery cylinder.

A refrigerant charging method according to a third aspect is the refrigerant charging method according to the first aspect, in which, in the step (b), the weight of the refrigerant that is transferred from the first heat source unit to the second heat source unit is measured by using a scale that measures a weight of the first heat source unit that is after the refrigerant is recovered in the first heat source unit through pump down operation that is performed to cause the refrigerant of the already installed refrigeration cycle apparatus to be recovered in the first heat source unit.

In the refrigerant charging method according to the third aspect, the weight of the first heat source unit that is after a recovery object refrigerant is recovered in the first heat source unit through pump down operation is measured by the scale, and it is thus possible to measure the weight of the first heat source unit that is, for example, before and after the refrigerant is sent from the first heat source unit. As a result, it is possible to precisely measure the amount of the refrigerant that is transferred from the first heat source unit to the second heat source unit.

A refrigerant charging method according to a fourth aspect is the refrigerant charging method according to the first aspect, in which, in the step (b), the weight of the refrigerant that is transferred from the first heat source unit to the second heat source unit is measured by using a mass flow meter that measures a mass of the refrigerant that flows from the first heat source unit to the second heat source unit.

In the refrigerant charging method according to the fourth aspect, the mass of the refrigerant that flows from the first heat source unit to the second heat source unit is measured by the mass flow meter, and it is thus possible to directly measure, with precision, the amount of the refrigerant that is transferred from the first heat source unit to the second heat source unit.

A refrigerant charging method according to a fifth aspect is the refrigerant charging method according to the first aspect, in which, in the step (b), the weight of the refrigerant that is transferred from the first heat source unit to the second heat source unit is measured by using a scale that measures a weight of the second heat source unit in which the refrigerant has been transferred from the first heat source unit.

In the refrigerant charging method according to the fifth aspect, the weight of the second heat source unit in which the recovered refrigerant has been transferred from the first heat source unit is measured by the scale, and it is thus possible to measure the weight of the second heat source unit that is, for example, before and after the recovered refrigerant is transferred to the second heat source unit. As a result, it is possible to precisely measure the amount of the refrigerant that is transferred from the first heat source unit to the second heat source unit.

A refrigerant charging method according to a sixth aspect is the refrigerant charging method according to any of the first aspect to the fifth aspect, further including a step of causing the refrigerant, when transferring the recovered refrigerant from the first heat source unit to the second heat source unit, to flow through a filter that removes a foreign material from the refrigerant and/or a dryer that removes moisture from the refrigerant.

In the refrigerant charging method according to the sixth aspect, when the recovered refrigerant is to be transferred from the first heat source unit to the second heat source unit, the refrigerant is caused to flow through the filter and/or the dryer, and it is thus possible to remove a foreign material and/or moisture from the refrigerant that is transferred from the first heat source unit to the second heat source unit.

A refrigerant charging method according to a seventh aspect is the refrigerant charging method according to the sixth aspect, in which the filter and/or the dryer is disposed in a bypass in which the refrigerant does not flow during normal operation of the refrigeration cycle apparatus.

In the refrigerant charging method according to the seventh aspect, the filter and/or the dryer is disposed in the bypass, and it is thus possible to remove a foreign material and/or moisture by causing the recovered refrigerant to be transferred through the bypass in which the filter and/or the dryer is disposed. It is possible by causing the refrigerant not to pass through the bypass during normal operation to suppress an increase of flow path resistance and suppress an increase of energy loss.

A refrigerant charging method according to an eighth aspect is the refrigerant charging method according to any of the first aspect to the seventh aspect, in which the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

In the refrigerant charging method according to the eighth aspect, the second heat source unit includes, before the recovered refrigerant is transferred from the first heat source unit to the second heat source unit, the antioxidant and/or the oxygen absorbent that exerts an effect in the flow path of the refrigerant that circulates in the refrigeration cycle apparatus, and it is thus possible by only transferring the refrigerant to the second heat source unit to activate the antioxidant and/or the oxygen absorbent. As a result, it is possible to save time and labor when charging the refrigerant to the second heat source unit.

A refrigerant charging method according to a ninth aspect is the refrigerant charging method according to any of the first aspect to the eighth aspect, further including a step of heating the refrigerant by operating the already installed refrigeration cycle apparatus before recovering the refrigerant from the first heat source unit.

In the refrigerant charging method according to the ninth aspect, the already installed refrigeration cycle apparatus is operated to heat the refrigerant before the refrigerant is recovered from the first heat source unit, and it is thus possible to separate oil dissolved in the refrigerant and possible to reduce oil included in the recovered refrigerant recovered from the first heat source unit.

DESCRIPTION OF EMBODIMENTS (1) Overall Configuration

Figure 1:
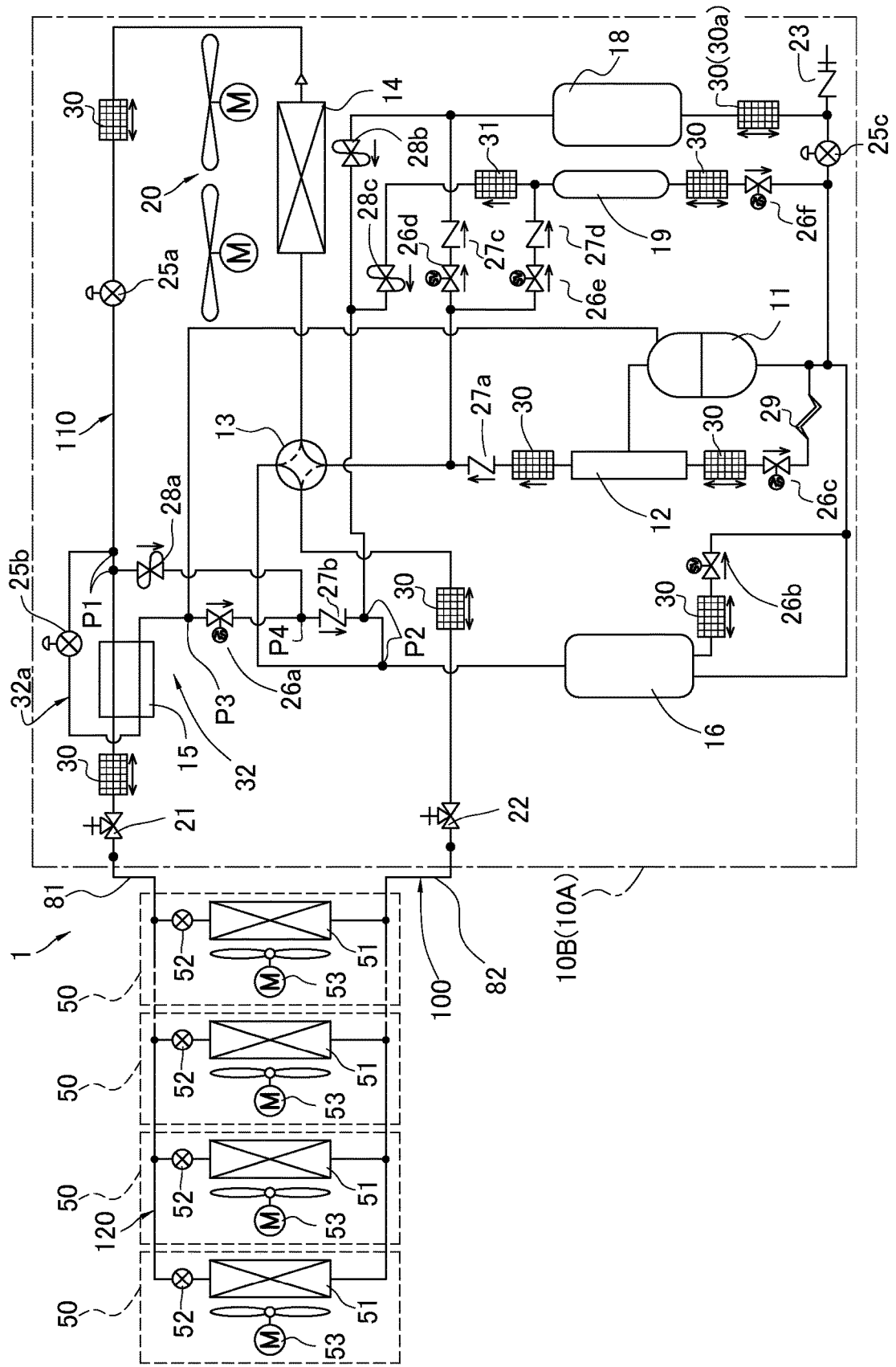
FIG. 1 is a refrigerant circuit diagram illustrating an outline of the configuration of a refrigeration cycle apparatus according to an embodiment.

In FIG. 1, an example of the configuration of a refrigeration cycle apparatus that is an object of a refrigerant charging method is illustrated. A refrigeration cycle apparatus 1 illustrated in FIG. 1 is an apparatus in which a refrigeration cycle is to be performed by a refrigerant that circulates in a refrigerant circuit 100. The refrigeration cycle apparatus 1 repeats a cycle of compression of the refrigerant, heat radiation from the refrigerant, decompression expansion of the refrigerant, and heat absorption into the refrigerant. The refrigeration cycle apparatus 1 includes a first heat source unit 10A or a second heat source unit 10B switchable to have a function of heat radiation or to have a function of heat absorption in the refrigeration cycle, and a utilization unit 50 connected to the first heat source unit 10A or the second heat source unit 10B. Here, the first heat source unit 10A is a heat source unit before renewal, and the second heat source unit 10B is a heat source unit after renewal.

A case in which the refrigeration cycle apparatus 1 after renewal includes the second heat source unit 10B is presented as an example and described here. However, a case in which a refrigerant recovered from the first heat source unit 10A of the already installed refrigeration cycle apparatus 1 is to be charged to the second heat source unit 10B is not limited to such a case of renewal of the refrigeration cycle apparatus 1. For example, the second heat source unit 10B may be included in another refrigeration cycle apparatus of a building adjacent to a building at which the refrigeration cycle apparatus 1 is installed. A refrigerant to be recovered and charged means a refrigerant that is recovered from the first heat source unit 10A.

The utilization unit 50 cools an object by utilizing heat absorption of the refrigerant when the first heat source unit 10A or the second heat source unit 10B is a heat source whose heat is radiated from the refrigerant. The utilization unit 50 heats an object by utilizing heat radiation of the refrigerant when the first heat source unit 10A or the second heat source unit 10B is a heat source whose heat is absorbed by the refrigerant.

The refrigeration cycle apparatus 1 is applicable to an air conditioning apparatus that performs cooling and heating. In this case, for example, the first heat source unit 10A or the second heat source unit 10B serves as an outdoor unit of the air conditioning apparatus, and the utilization unit 50 serves as an indoor unit of the air conditioning apparatus. The utilization unit 50 that is the indoor unit cools or heats air in an air-conditioning object space to perform cooling or heating. Note that, although a case in which the refrigeration cycle apparatus 1 is applied to an air conditioning apparatus is presented as an example and described here, the refrigeration cycle apparatus is also applicable to other apparatuses and applicable to, for example, a heat pump boiler, a refrigerator, and a cooling apparatus that cools inside a chamber.

Figure 2:
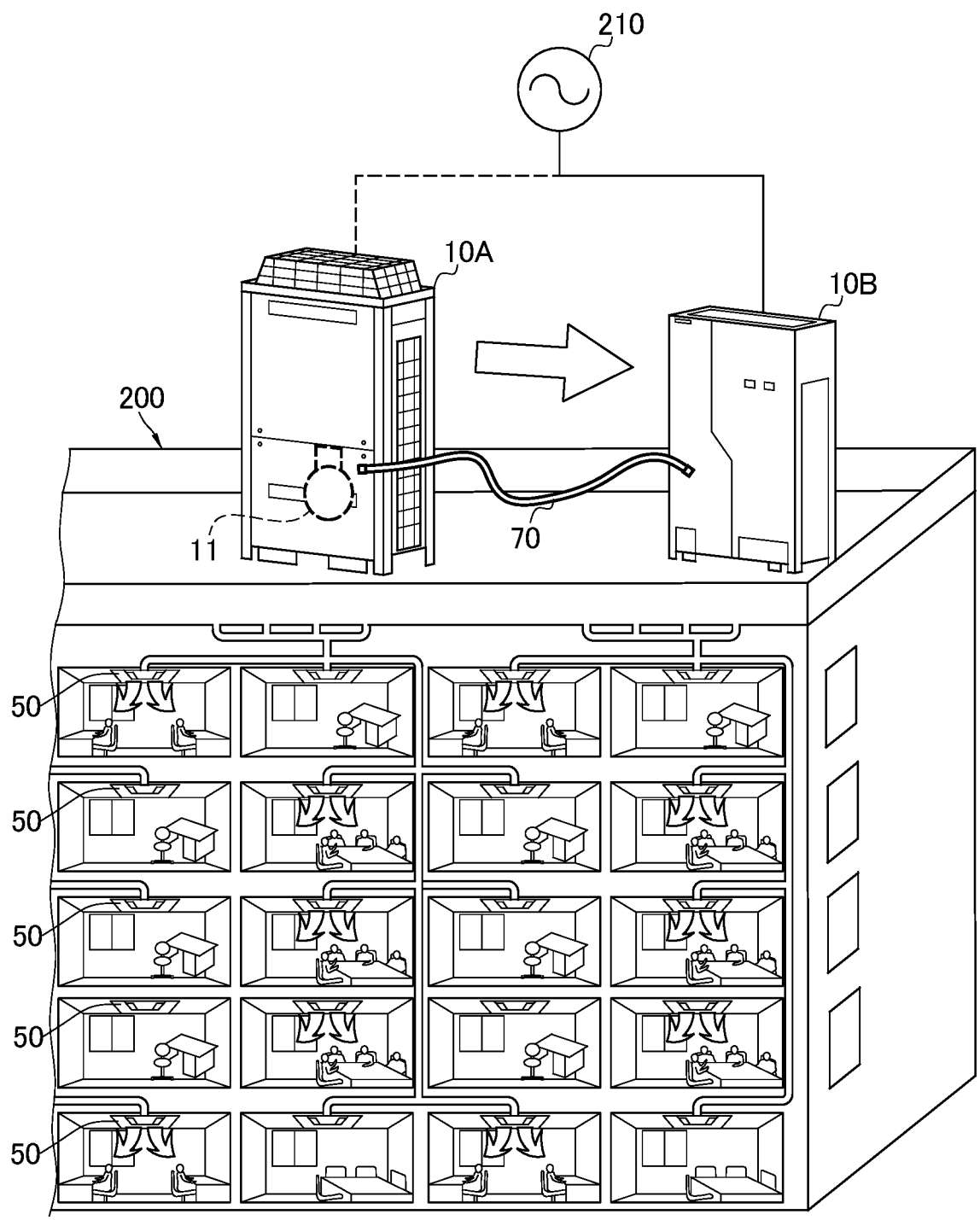
FIG. 2 is a schematic diagram for describing transfer of a refrigerant from a first heat source unit to a second heat source unit.
Figure 3:
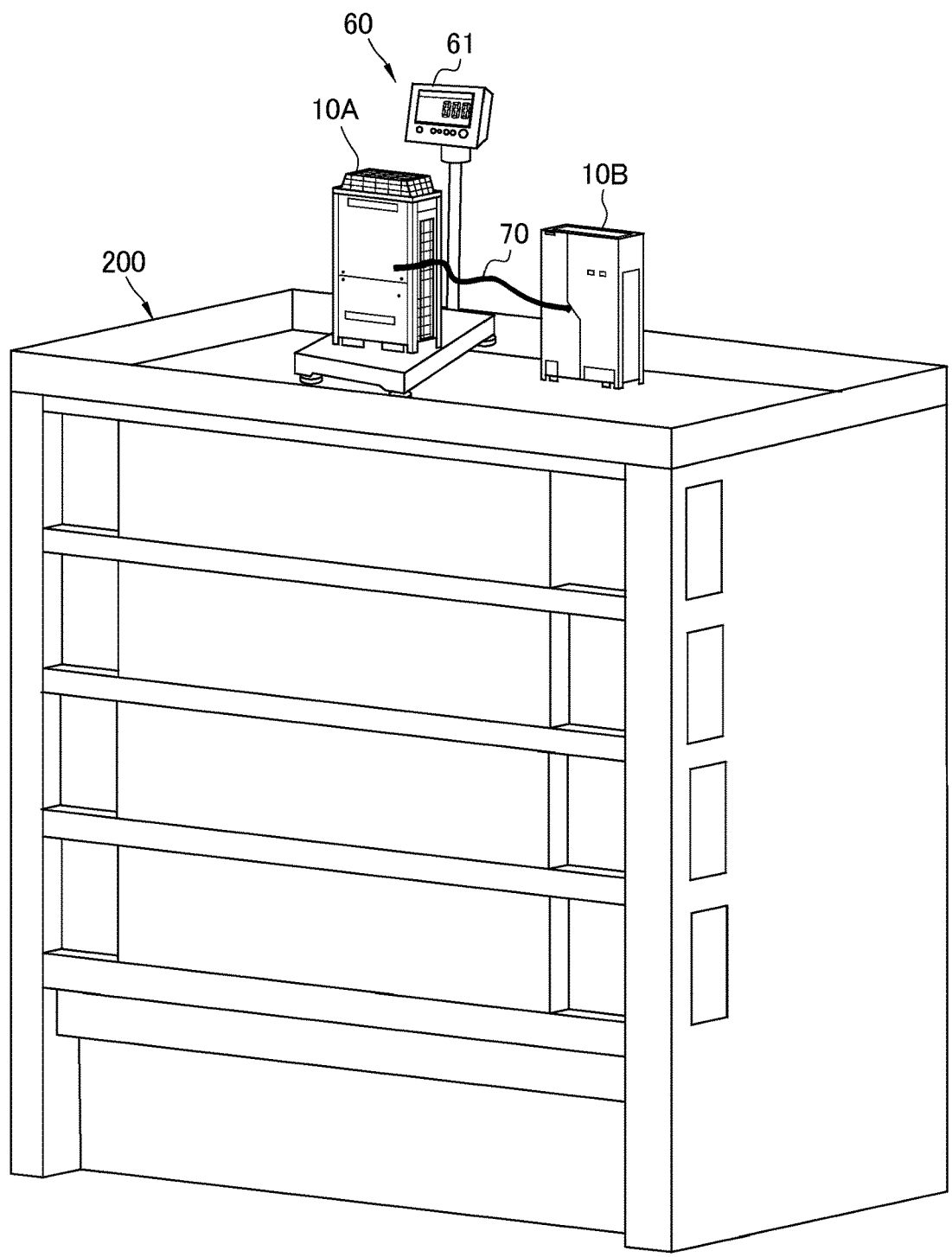
FIG. 3 is a schematic diagram for describing measurement of the weight of a refrigerant transferred from the first heat source unit to the second heat source unit.

In FIG. 2 and FIG. 3, regarding a case in which the refrigeration cycle apparatus 1 is an air conditioning apparatus, an example in which the refrigeration cycle apparatus 1 is installed at a building 200 is illustrated. In the example illustrated in FIG. 2, the first heat source unit 10A or the second heat source unit 10B is installed at the rooftop of the building 200. As illustrated in FIG. 2, a plurality of utilization units 50 are installed in respective rooms to perform air conditioning of each room in the building 200.

In FIG. 2 and FIG. 3, the first heat source unit 10A before renewal included in the already installed refrigeration cycle apparatus 1 and the second heat source unit 10B that is planned to be included in the refrigeration cycle apparatus 1 after renewal are illustrated. In other words, the first heat source unit 10A is an old heat source unit, and the second heat source unit 10B is a new heat source unit. The already installed refrigeration cycle apparatus 1 has already been installed at the building 200 and has an experience of performing a refrigeration cycle by circulating a refrigerant before renewal. The refrigerant is present in each of the first heat source unit 10A and the plurality of utilization units 50 included in the refrigeration cycle apparatus 1. Here, a refrigerant that is included in the inner portion of the refrigeration cycle apparatus 1 for the purpose of circulating in the refrigerant circuit 100 is referred to as a circulating refrigerant.

As described in the flowchart in FIG. 4, a refrigerant charging method, which will be described below, for the above-described refrigeration cycle apparatus 1 is configured to include a step S3 of transferring a refrigerant from the first heat source unit 10A to the second heat source unit 10B and a step S4 of using a measurement system that measures the weight of a refrigerant, in the measurement of the amount of the refrigerant that is transferred from the first heat source unit 10A to the second heat source unit 10B.

Figure 4:
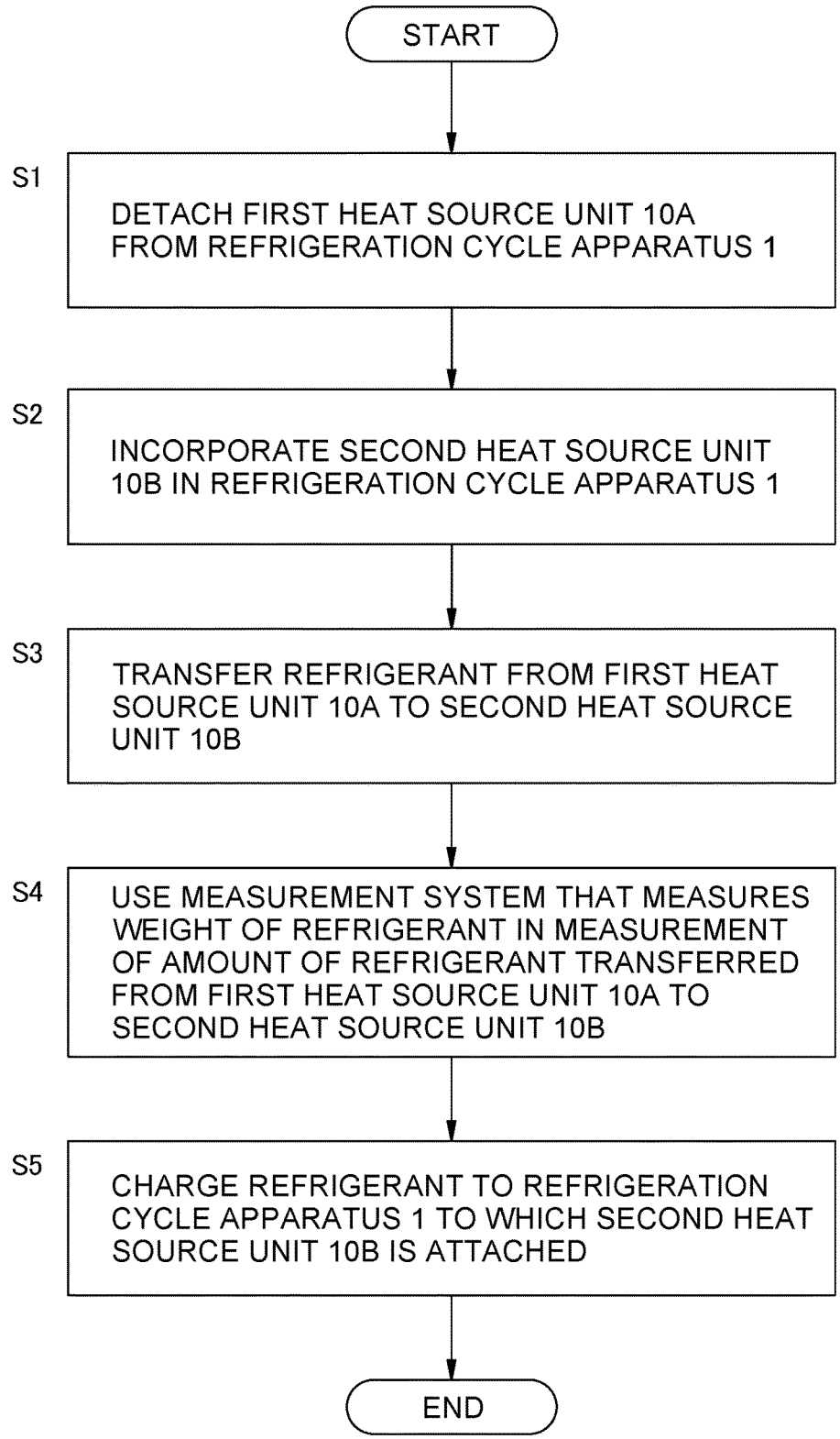
FIG. 4 is a flowchart illustrating an outline of a flow of a refrigerant charging method.

As illustrated in FIG. 4, in a state in which the circulating refrigerant of the refrigeration cycle apparatus 1 has been transferred to the first heat source unit 10A through pump down operation, the first heat source unit 10A is first detached from the refrigeration cycle apparatus 1 (step S1). When the first heat source unit 10A is to be detached, a high-pressure-side shutoff valve 21 and a low-pressure-side shutoff valve 22 of the first heat source unit 10A are closed.

Next, the second heat source unit 10B is incorporated in the refrigeration cycle apparatus 1 (step S2). With respect to the refrigeration cycle apparatus 1 after the second heat source unit 10B is incorporated therein, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump.

In FIG. 2, a state in which a refrigerant is transferred from the first heat source unit 10A to the second heat source unit 10B is schematically illustrated. In a state of being incorporated in the refrigeration cycle apparatus 1 after renewal, the second heat source unit 10B is connected to a power source 210 and in an operable state. The first heat source unit 10A and the second heat source unit 10B are connected to each other by a charge hose 70. In response to the operation of the second heat source unit 10B, the refrigerant is transferred from the first heat source unit 10A through the charge hose 70 to the second heat source unit 10B (step S3). At this time, the first heat source unit 10A is, for example, in a state of being temporarily placed at the rooftop of the building 200 and is not connected to the power source 210.

In FIG. 3, a state in which the weight of the recovered refrigerant recovered in the second heat source unit 10B from the first heat source unit 10A is measured is illustrated. The weight of the first heat source unit 10A is measured by a scale 61. The scale 61 measures the recovered refrigerant recovered from the first heat source unit 10A by measuring the weight of the first heat source unit 10A both of before the recovered refrigerant is transferred from the first heat source unit 10A and after the recovered refrigerant is transferred from the first heat source unit 10A. The weight of the recovered refrigerant can be calculated by subtracting a measured value obtained by the scale 61 regarding the first heat source unit 10A that is before transfer of the recovered refrigerant from the first heat source unit 10A from a measured value obtained by the scale 61 regarding the first heat source unit 10A that is after transfer of the recovered refrigerant from the first heat source unit 10A (step S4).

When, if only with the recovered refrigerant, the circulating refrigerant is lacking for the refrigeration cycle apparatus 1 in which the second heat source unit 10B is incorporated, an additional refrigerant is added, and refrigerant charging is completed (step S5). The gross weight of the refrigerants proper for the refrigeration cycle apparatus 1 after renewal in which the second heat source unit 10B is incorporated can be previously calculated by using data of the already installed refrigeration cycle apparatus 1 in which the first heat source unit 10A is incorporated. It is possible to obtain the weight of a lacking refrigerant by subtracting the weight of the recovered refrigerant measured by a measurement system 60 in the step S4 from the gross weight of the refrigerants proper for the refrigeration cycle apparatus 1 after renewal. When the weight of the recovered refrigerant exceeds the gross weight of the refrigerants proper for the refrigeration cycle apparatus 1 after renewal, it is sufficient to extract the recovered refrigerant of the weight corresponding to an excess from the refrigeration cycle apparatus 1 after renewal. When the gross weight of the refrigerants proper for the refrigeration cycle apparatus 1 after renewal is set in a prescribed range, calculation may be performed by using, for example, a median value of the prescribed range.

The renewal work from the step S1 to the step S5 described above is performed at a local site. Here, performing the renewal work at a local site means that the recovered refrigerant is not taken back to facilities, such as a factory, and the recovered refrigerant as it is or treated at the installation location of the refrigeration cycle apparatus 1 is recharged to the refrigeration cycle apparatus 1 after renewal. In the above-described case, the work from the step S1 to the step S5 is performed, for example, at the rooftop of the building 200. The renewal work from the step S1 to the step S5 is preferably performed within one day and is more preferably performed during the daytime of one day. This is because an environmental change is small, a work object is easily visually recognized, and refrigerant leakage and mixing of a foreign material into the refrigeration cycle apparatus 1 are easily prevented.

(2) Detailed Configuration (2-1) Configuration of Refrigeration Cycle Apparatus 1

In the refrigeration cycle apparatus 1 illustrated in FIG. 1, one first heat source unit 10A or one second heat source unit 10B and a plurality of the utilization units 50 are connected by connection pipes 81 and 82. In the refrigeration cycle apparatus 1, a heat-source-side circuit 110 in the first heat source unit 10A or the second heat source unit 10B and a utilization-side circuit 120 in each utilization unit 50 are connected to each other, thereby configuring the refrigerant circuit 100. In the refrigeration cycle apparatus 1, circulation of the refrigerant in the refrigerant circuit 100 causes a vapor compression refrigeration cycle to repeat. An example in which the refrigeration cycle apparatus 1 is applied to an air conditioning apparatus will be described here.

(2-1-1) First Heat Source Unit 10A, Second Heat Source Unit 10B

To simplify the description, a case in which the first heat source unit 10A before renewal and the second heat source unit 10B after renewal have the same configuration will be described here; however, the technology according to the present disclosure is applicable even when the configurations thereof are not same. For example, as illustrated in FIG. 1, each of the first heat source unit 10A and the second heat source unit 10B includes a compressor 11, an oil separator 12, a four-way valve 13, a heat-source-side heat exchanger 14, a subcooling heat exchanger 15, an accumulator 16, a refrigerant regulator 18, an oil regulator 19, a heat-source-side fan 20, the high-pressure-side shutoff valve 21, the low-pressure-side shutoff valve 22, a charge port 23, a first expansion valve 25a to a third expansion valve 25c, a first electromagnetic valve 26a to a sixth electromagnetic valve 26f, a first check valve 27a to a fourth check valve 27d, a first pressure regulating valve 28a to a third pressure regulating valve 28c, a capillary tube 29, a plurality of filters 30, and a strainer 31.

The heat-source-side heat exchanger 14 is, for example, a fin-and-tube heat exchanger and exchanges heat between air and a refrigerant. As the subcooling heat exchanger 15, for example, a plate heat exchanger is usable. The first electromagnetic valve 26a to the sixth electromagnetic valve 26f each have a function of opening and closing a flow path. The first pressure regulating valve 28a to the third pressure regulating valve 28c each have a function of keeping the pressure of the refrigerant on the upstream side at a prescribed absolute pressure that is previously determined. The tips of the arrows given to the first pressure regulating valve 28a to the third pressure regulating valve 28c indicate the downstream side of the first pressure regulating valve 28a to the third pressure regulating valve 28c. The filters 30 each have a function of removing a foreign material from the refrigerant that passes therethrough. The strainer 31 has a function of removing a solid component from the refrigerant.

The discharge side of the compressor 11 is connected to the first port of the four-way valve 13 via the oil separator 12 and the first check valve 27a. The refrigerant discharged from the compressor 11 is separated from oil at the oil separator 12 and flows toward the first port of the four-way valve 13. The second port of the four-way valve 13 is connected to one entrance of the heat-source-side heat exchanger 14, the third port of the four-way valve 13 is connected to an inlet of the accumulator 16, and the fourth port of the four-way valve 13 is connected to the low-pressure-side shutoff valve 22. In the four-way valve 13, the first port and the second port are in communication with each other while the third port and the fourth port are in communication with each other, as indicated by solid lines, during cooling operation, and the first port and the fourth port are in communication with each other while the second port and the third port are in communication with each other, as indicated by broken lines, during heating operation.

The other entrance of the heat-source-side heat exchanger 14 is connected to one end of the first expansion valve 25a and connected to the high-pressure-side shutoff valve 21 via the first expansion valve 25a. The subcooling heat exchanger 15 is installed between the other end of the first expansion valve 25a and the high-pressure-side shutoff valve 21. The first expansion valve 25a is provided on the liquid side of the heat-source-side heat exchanger 14 and able to regulate the degree of decompression of the refrigerant that passes therethrough. The subcooling heat exchanger 15, a subcooling circuit 32a, and a second expansion valve 25b constitute a subcooling portion 32. The subcooling circuit 32a diverges from a diverging point P1 at a part extending from the other end of the first expansion valve 25a toward the high-pressure-side shutoff valve 21 and is connected, through the subcooling heat exchanger 15, to a merging point P2 between the four-way valve 13 and the accumulator 16. The second expansion valve 25b provided between the diverging point P1 and the subcooling heat exchanger 15 is able to regulate the degree of decompression of the refrigerant that passes through the subcooling circuit 32a. The subcooling heat exchanger 15 causes heat to be exchanged between the refrigerant that flows between the diverging point P1 and the high-pressure-side shutoff valve 21 and the refrigerant that flows from the diverging point P1 toward the merging point P2 in the subcooling circuit 32a.

A diverging point P3, the first electromagnetic valve 26a, a merging point P4, and the second check valve 27b are provided in this order from the subcooling heat exchanger 15 toward the merging point P2 in the subcooling circuit 32a. The diverging point P1 and the merging point P4 are connected to each other via the first pressure regulating valve 28a, and the refrigerant flows from the diverging point P1 toward the merging point P4. The diverging point P3 is connected to an injection port of the compressor 11. Accordingly, an intermediate-pressure refrigerant decompressed at the second expansion valve 25b exits from the subcooling heat exchanger 15, diverges on the upstream of the first electromagnetic valve 26a, and flows into the injection port of the compressor 11.

One outlet of the accumulator 16 is directly connected to the suction side of the compressor 11 to return a gas refrigerant to the suction side of the compressor 11, and the other outlet of the accumulator 16 is connected for oil-returning to the suction side of the compressor 11 via the filters 30 and the second electromagnetic valve 26b. Between the suction side of the compressor 11 and the oil separator 12, a path that passes the filters 30, the third electromagnetic valve 26c, and the capillary tube 29 is formed to return the separated oil to the compressor 11.

One entrance of the refrigerant regulator 18 is connected to the suction side of the compressor 11 via the third expansion valve 25c. The refrigerant regulator 18 is a device that regulates the amount of the refrigerant that flows in the refrigerant circuit 100. The other entrance of the refrigerant regulator 18 is connected to the merging point P2 via the second pressure regulating valve 28b. The outflow side of the first check valve 27a is connected to the other entrance of the refrigerant regulator 18 via the fourth electromagnetic valve 26d and the third check valve 27c. The refrigerant regulator 18 has a function of keeping the amount of the refrigerant that flows in the refrigerant circuit 100 to be constant.

One entrance of the oil regulator 19 is connected to the suction side of the compressor 11 via the sixth electromagnetic valve 26f The other entrance of the oil regulator 19 is connected to the merging point P2 via the third pressure regulating valve 28c. The outflow side of the first check valve 27a is connected to the other entrance of the oil regulator 19 via the fifth electromagnetic valve 26e and the fourth check valve 27d. The oil regulator 19 has a function of keeping the amount of oil supplied to the refrigerant circuit 100 to be constant.

The heat-source-side fan 20 is disposed at the heat-source-side heat exchanger 14. The heat-source-side fan 20 causes an airflow for accelerating heat exchange to be generated in the heat-source-side heat exchanger 14.

The filters 30 are provided between the oil separator 12 and the first check valve 27a, between the heat-source-side heat exchanger 14 and the first expansion valve 25a, between the subcooling heat exchanger 15 and the high-pressure-side shutoff valve 21, between the fourth port of the four-way valve 13 and the low-pressure-side shutoff valve 22, between the other outlet of the accumulator 16 and the second electromagnetic valve 26b, between the oil separator 12 and the third electromagnetic valve 26c, between the third expansion valve 25c and the refrigerant regulator 18, and between the oil regulator 19 and the sixth electromagnetic valve 26f. The strainer 31 is provided between the oil regulator 19 and the third pressure regulating valve 28c. The charge port 23 is provided between a filter 30a and the third expansion valve 25c. The sign of 30a is given here for distinction from the other filters 30.

(2-1-2) Utilization Units 50

As illustrated in FIG. 1, each of the utilization units 50 includes, for example, a utilization-side heat exchanger 51, a utilization-side expansion valve 52, and a utilization-side fan 53. The utilization-side heat exchanger 51 is, for example, a fin-and-tube heat exchanger and causes heat to be exchanged between air and a refrigerant. The utilization-side expansion valve 52 and the utilization-side heat exchanger 51 are series connected between the liquid-side connection pipe 81 and the gas-side connection pipe 82. The utilization-side expansion valve 52 and the utilization-side heat exchanger 51 are disposed in the order of the utilization-side expansion valve 52 and the utilization-side heat exchanger 51 from the liquid-side connection pipe 81 toward the gas-side connection pipe 82. The utilization-side fan 53 is disposed at each utilization-side heat exchanger 51. The utilization-side fan 53 causes an airflow for accelerating heat exchange to be generated in the utilization-side heat exchanger 51. The plurality of utilization units 50 parallel connected between the liquid-side connection pipe 81 and the gas-side connection pipe 82 constitute the utilization-side circuit 120.

(2-1-3) Cooling Operation

In cooling operation, the refrigeration cycle apparatus 1 causes the four-way valve 13 to be in the state indicated by the solid lines, in other words, in a state in which the first port and the second port are in communication each other while the third port and the fourth port are in communication with each other. In the refrigeration cycle performed in cooling operation, the heat-source-side heat exchanger 14 functions as a radiator, and the utilization-side heat exchanger 51 functions as an evaporator. The refrigerant discharged from the compressor 11 successively circulates in the heat-source-side heat exchanger 14, the utilization-side expansion valve 52, and the utilization-side heat exchanger 51 and repeats the vapor compression refrigeration cycle of compression, condensation, expansion, and evaporation.

The refrigeration cycle apparatus 1 controls the operation frequency of the compressor 11 to cause the evaporation pressure or the evaporation temperature in the utilization-side heat exchanger 51 to be a target pressure or a target evaporation temperature and controls the valve opening degree of each utilization-side expansion valve 52 to cause the degree of superheating of the refrigerant that flows on the gas side of the utilization-side heat exchanger 51 to be a target degree of superheating. In cooling operation, the first expansion valve 25a is in a fully opened state. The refrigeration cycle apparatus 1 regulates the opening degree of the second expansion valve 25b to cause the degree of superheating of the refrigerant that has exited from the subcooling heat exchanger 15 to be a target degree of superheating. When a prescribed condition is satisfied, the refrigeration cycle apparatus 1 causes the refrigerant that flows in the subcooling circuit 32a to exchange heat in the subcooling heat exchanger 15 with the refrigerant that flows between the diverging point P1 and the high-pressure-side shutoff valve 21 and to become a gas refrigerant having an intermediate pressure and supplies the refrigerant through the injection port to a compression chamber of the compression mechanism of the compressor 11 in the middle of compression. The compressor 11 that has been supplied with the gas refrigerant having the intermediate pressure can decrease the discharge temperature, compared with when injection of the gas refrigerant is not performed.

(2-1-4) Heating Operation

In heating operation, the refrigeration cycle apparatus 1 causes the four-way valve 13 to be in the state indicated by the broken lines, in other words, in a state in which the first port and the fourth port are in communication with each other while the second port and the third port are in communication with each other. In the refrigeration cycle performed in heating operation, the heat-source-side heat exchanger 14 functions as an evaporator, and the utilization-side heat exchanger 51 functions as a radiator. The refrigerant discharged from the compressor 11 successively circulates in the utilization-side heat exchanger 51, the first expansion valve 25a, and the heat-source-side heat exchanger 14 and repeats the vapor compression refrigeration cycle of compression, condensation, expansion, and evaporation.

In heating operation, the second expansion valve 25b is a fully closed state. The refrigeration cycle apparatus 1 controls the operation frequency of the compressor 11 to cause the condensation temperature in the utilization-side heat exchanger 51 to be a target condensation temperature and controls the valve opening degree of the utilization-side expansion valve 52 to cause the degree of subcooling of the refrigerant that flows on the liquid side of the utilization-side heat exchanger 51 to be a target degree of subcooling. The refrigeration cycle apparatus 1 controls the valve opening degree of the first expansion valve 25a to cause the degree of superheating of the refrigerant that flows on the gas side of the heat-source-side heat exchanger 14 to be a target degree of superheating.

(2-2) Measurement System 60

The measurement system 60 includes the scale 61, which is illustrated in FIG. 3. The scale 61 is, for example, a platform weighing scale or a crane weighing scale. The scale 61 has a function capable of measuring the weight of the first heat source unit 10A or the second heat source unit 10B and has resolving power sufficient for detecting the weight of the refrigerant.

(2-3) Refrigerant

When the refrigeration cycle apparatus 1 is configured to be compatible with, for example, an R410A refrigerant, the first heat source unit 10A and the second heat source unit 10B are each configured to be compatible with the R410A refrigerant. The R410A refrigerant is a mixture refrigerant including difluoromethane and pentafluoroethane. The mixture ratio of difluoromethane and pentafluoroethane in the R410A refrigerant may change in the refrigeration cycle apparatus 1, even in a normal use state, with a lapse of time. The refrigeration cycle apparatus 1 is thus designed to properly operate even when mixture of difluoromethane and pentafluoroethane changes. Accordingly, when the circulating refrigerant is to be recovered from the refrigerant circuit 100 of the already installed refrigeration cycle apparatus 1 in which the first heat source unit 10A has been incorporated, and the recovered refrigerant is to be used in the newly installed refrigeration cycle apparatus 1 in which the second heat source unit 10B is incorporated, the R410A refrigerant may be charged or difluoromethane or pentafluoroethane, which is a component of the R410A refrigerant, may be charged to supplement the amount of the lacking refrigerant.

When the refrigeration cycle apparatus 1 is compatible with a mixture refrigerant, a mixture refrigerant may be replenished or a refrigerant that is a component of the mixture refrigerant may be replenished to supplement the amount of the refrigerant lacking if only with the recovered refrigerant.

(2-4) Transfer of Refrigerant

In the transfer of the refrigerant from the first heat source unit 10A to the second heat source unit 10B, for example, with the first heat source unit 10A being incorporated in the refrigeration cycle apparatus 1 and being in an operable state, the refrigerant of the utilization-side circuit 120 is transferred to the heat-source-side circuit 110 of the first heat source unit 10A through pump down operation. Then, the high-pressure-side shutoff valve 21 and the low-pressure-side shutoff valve 22 of the first heat source unit 10A are closed. In the state in which the high-pressure-side shutoff valve 21 and the low-pressure-side shutoff valve 22 of the first heat source unit 10A are closed after the pump down operation, the first heat source unit 10A is detached and made to be in a temporarily placed state. In the pump down operation, for example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed.

After the first heat source unit 10A is detached from the refrigeration cycle apparatus 1, the second heat source unit 10B is incorporated in the refrigeration cycle apparatus 1. Then, as illustrated in FIG. 2, a service port of the high-pressure-side shutoff valve 21 of the first heat source unit 10A and the charge port 23 of the second heat source unit 10B are connected to each other by the charge hose 70. Here, a means of transferring the refrigerant includes the charge hose 70. The second heat source unit 10B is operated to drive the compressor 11, and the refrigerant is transferred through the service port of the high-pressure-side shutoff valve 21 of the first heat source unit 10A into the charge port 23 of the second heat source unit 10B. When the second heat source unit 10B is to be operated to drive the compressor 11, the third expansion valve 25c is closed, cooling operation is performed, and the recovered refrigerant is sucked along a path in which the recovered refrigerant is sucked from the refrigerant regulator 18 by the compressor 11 through the accumulator 16. By detaching the charge hose 70 from the service port of the high-pressure-side shutoff valve 21 and the charge port 23, the service port of the high-pressure-side shutoff valve 21 and the charge port 23 are closed.

(3) Modifications (3-1) Modification 1A

In the aforementioned embodiment, a case in which both of the first heat source unit 10A and the second heat source unit 10B of the refrigeration cycle apparatus 1 are configured such that heat radiation and heat absorption of the refrigeration cycle are switchable has been described; however, the refrigeration cycle apparatus 1 is not limited to having such a configuration. In the refrigeration cycle apparatus 1, for example, the first heat source unit 10A or the second heat source unit 10B may be an exclusive machine that functions as a heat source whose heat is radiated from the refrigerant, and the utilization units 50 may be exclusive machines each function as a device whose heat is absorbed by the refrigerant. In this case, when the refrigeration cycle apparatus 1 is an air conditioning apparatus, the exclusive machines are machines exclusive for cooling. In the refrigeration cycle apparatus 1, for example, the first heat source unit 10A or the second heat source unit 10B may be an exclusive machine that functions as a heat source whose heat is absorbed by the refrigerant, and the utilization units 50 may be exclusive machines each function as a device whose heat is radiated from the refrigerant. In this case, when the refrigeration cycle apparatus 1 is an air conditioning apparatus, the exclusive machines are machines exclusive for heating.

(3-2) Modification 1B

An operation of measurement in the step S4 is performed after an operation of transferring the refrigerant in the step S3; however, the order of performing the operations in the step S3 and the step S4 is not limited to the order illustrated in FIG. 3. For example, the operation in the step S3 may be performed after the step S4. Alternatively, the operations in the step S3 and the step S4 may be performed in parallel.

(3-3) Modification 1C

In the aforementioned embodiment, a case in which the refrigerant is the R410A refrigerant or the R32 refrigerant has been described; however, the refrigerant usable in the refrigeration cycle apparatus 1 is not limited thereto. For example, the refrigerant may be an R452B refrigerant or an R125 refrigerant and may be a refrigerant other than a HFC refrigerant.

(3-4) Modification 1D

In the aforementioned embodiment, the refrigeration cycle apparatus 1 of a multi type in which the refrigeration cycle apparatus 1 includes the plurality of utilization units 50 has been described. A refrigeration cycle apparatus to which the technology of the present disclosure is applicable is, however, not limited to the multi-type refrigeration cycle apparatus. The technology of the present disclosure is also applicable to, for example, a refrigeration cycle apparatus of a pair type in which one utilization unit is connected to one heat source unit.

The number of heat source units connected to the refrigeration cycle apparatus is not limited to one, and a plurality of heat source units may be connected thereto. For example, when the refrigeration cycle apparatus includes two first heat source units, it is sufficient to transport the recovered refrigerant to two second heat source units that replace the two first heat source units and to measure the weight of the two second heat source units that are after the transfer by the measurement system 60 to thereby detect the weight of the recovered refrigerant.

(3-5) Modification 1E

In the aforementioned embodiment, a case in which the compressor 11 of the first heat source unit 10A is used as a power source of the transfer of the refrigerant has been described. The power source of the transfer of the refrigerant is, however, not limited to the compressor 11 of the first heat source unit 10A. For example, a refrigerant recovering device that includes a compressor therein may be used for the transfer of the refrigerant.

(3-6) Modification 1F

Figure 5:
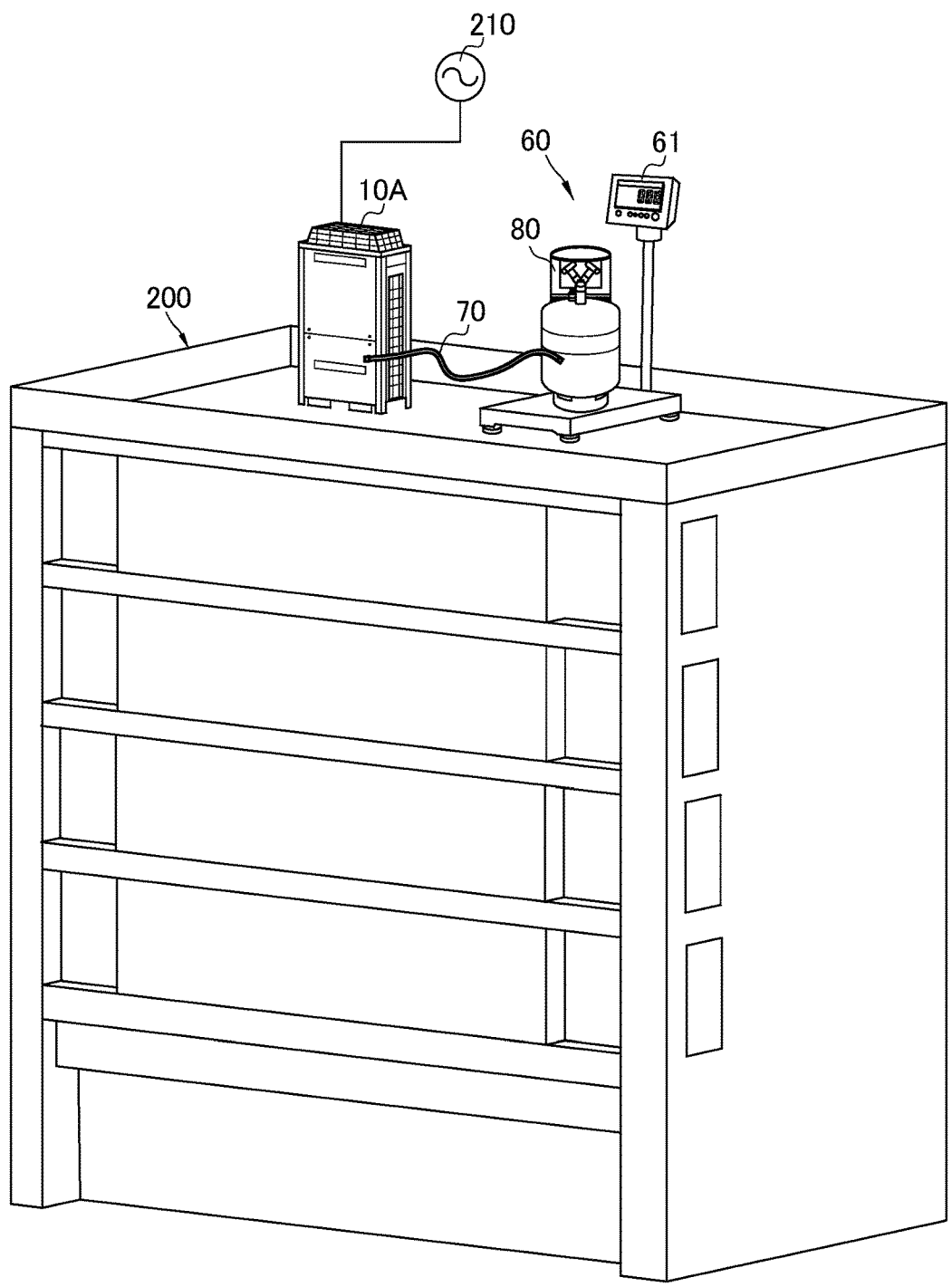
FIG. 5 is a schematic diagram for describing measurement of the weight of a refrigerant in a modification 1F.

In the aforementioned embodiment, a case in which the refrigerant is directly transferred from the first heat source unit 10A to the second heat source unit 10B has been described; however, as illustrated in FIG. 5, the refrigerant may be once transferred from the first heat source unit 10A to a recovery cylinder 80, and then, the refrigerant may be transferred from the recovery cylinder 80 to the second heat source unit 10B. In this case, it may be configured such that the scale 61 measures the weight of the recovery cylinder 80 before the recovery of the recovered refrigerant into the recovery cylinder 80 and the weight of the recovery cylinder 80 after the recovery of the recovered refrigerant into the recovery cylinder 80 and measures the weight of the recovered refrigerant from a difference between the weights of the recovery cylinder 80 before and after the recovery.

When the recovery cylinder 80 is to be thus used, for example, if the first heat source unit 10A is connected to the power source 210 and operable, the refrigerant of the utilization-side circuit 120 is transferred to the heat-source-side circuit 110 of the first heat source unit 10A through pump down operation. The service port of the high-pressure-side shutoff valve 21 of the first heat source unit 10A and the recovery cylinder 80 are connected to each other by the charge hose 70. As a result of the charge hose 70 being attached to the service port of the high-pressure-side shutoff valve 21 and the recovery cylinder 80, the heat-source-side circuit 110 of the first heat source unit 10A and the recovery cylinder 80 are in communication with each other. Then, the first heat source unit 10A is operated to drive the compressor 11, and the refrigerant is transferred through the service port of the high-pressure-side shutoff valve 21 of the first heat source unit 10A to the recovery cylinder 80. By closing the recovery cylinder 80 and detaching the charge hose 70 from the service port of the high-pressure-side shutoff valve 21 and the recovery cylinder 80, the service port of the high-pressure-side shutoff valve 21 is closed.

Figure 6:
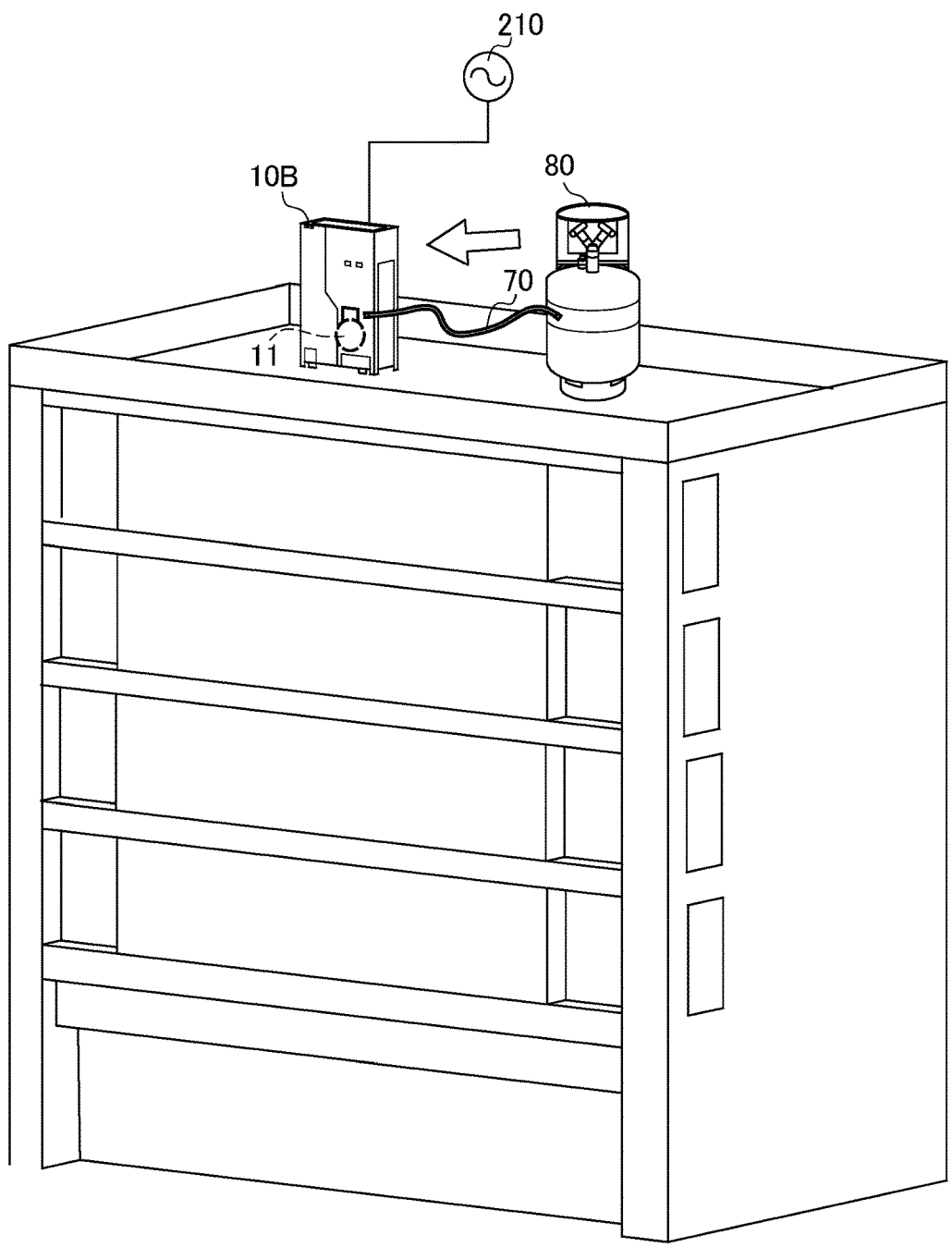
FIG. 6 is a schematic diagram for describing measurement of the weight of a refrigerant in the modification 1F.

With respect to the refrigeration cycle apparatus 1 after the second heat source unit 10B is incorporated therein, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump. When the recovered refrigerant is to be transferred from the recovery cylinder 80 to the second heat source unit 10B incorporated in the refrigeration cycle apparatus 1, the recovery cylinder 80 and the charge port 23 of the second heat source unit 10B are connected to each other, as illustrated in FIG. 6, by the charge hose 70. As a result of the charge hose 70 being attached to the charge port 23 and the recovery cylinder 80, the heat-source-side circuit 110 of the second heat source unit 10B and the recovery cylinder 80 are in communication with each other. Then, the second heat source unit 10B is operated to drive the compressor 11, and the refrigerant is transferred from the recovery cylinder 80 to the charge port 23 of the second heat source unit 10B. By closing the recovery cylinder 80 and detaching the charge hose 70 from the charge port 23 and the recovery cylinder 80, the charge port 23 is closed.

It may be configured such that the scale 61 measures the weight of the recovery cylinder 80 after the recovery of the recovered refrigerant into the recovery cylinder 80 and the weight of the recovery cylinder 80 after the transfer of the recovered refrigerant from the recovery cylinder 80 to the second heat source unit 10B and measures the weight of the recovered refrigerant from a difference between the weights of the recovery cylinder 80 before and after the transfer.

(3-7) Modification 1G

Figure 7:
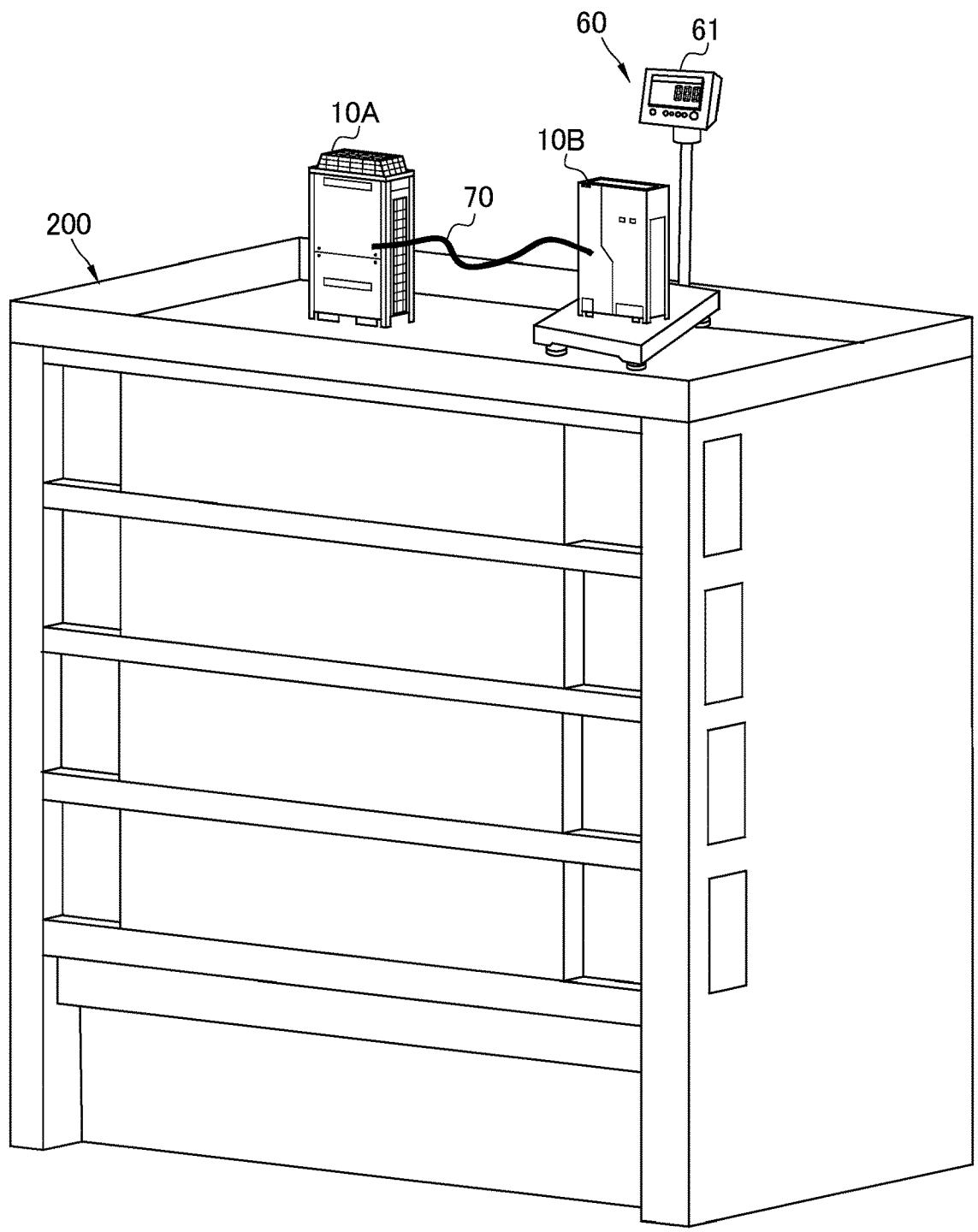
FIG. 7 is a schematic diagram for describing measurement of the weight of a refrigerant in a modification 1G.

In the aforementioned embodiment, a case in which the weight of the first heat source unit 10A before and after the transfer of the refrigerant to the second heat source unit 10B are measured has been described; however, as illustrated in FIG. 7, the weight of the second heat source unit 10B before and after the transfer of the refrigerant to the second heat source unit 10B may be measured. The weight of the second heat source unit 10B is measured by the scale 61. The scale 61 measures the recovered refrigerant transferred to the second heat source unit 10B by measuring the weight of the second heat source unit 10B both of before the recovered refrigerant is transferred to the second heat source unit 10B and after the recovered refrigerant is transferred to the second heat source unit 10B. It is possible to calculate the weight of the recovered refrigerant by subtracting a measured value obtained by the scale 61 regarding the second heat source unit 10B before the transfer of the recovered refrigerant to the second heat source unit 10B from a measured value obtained by the scale 61 regarding the second heat source unit 10B after the transfer of the recovered refrigerant to the second heat source unit 10B.

In the transfer of the refrigerant from the first heat source unit 10A to the second heat source unit 10B, for example, when the first heat source unit 10A is connected to the power source 210 and operable, the refrigerant of the utilization-side circuit 120 is transferred to the heat-source-side circuit 110 of the first heat source unit 10A through pump down operation. For example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed. The service port of the high-pressure-side shutoff valve 21 of the first heat source unit 10A and the charge port 23 of the second heat source unit 10B are connected to each other by the charge hose 70. As a result of the charge hose 70 being attached to the service port of the high-pressure-side shutoff valve 21 and the charge port 23, the heat-source-side circuit 110 of the first heat source unit 10A and the heat-source-side circuit 110 of the second heat source unit 10B are in communication with each other. Then, the first heat source unit 10A is operated to drive the compressor 11, and the refrigerant is transferred through the service port of the high-pressure-side shutoff valve 21 of the first heat source unit 10A to the charge port 23 of the second heat source unit 10B. By detaching the charge hose 70 from the service port of the high-pressure-side shutoff valve 21 and the charge port 23, the service port of the high-pressure-side shutoff valve 21 and the charge port 23 are closed. Since the recovered refrigerant has been transferred in the second heat source unit 10B, the recovered refrigerant in the second heat source unit 10B is charged to the refrigeration cycle apparatus 1 as a result of the second heat source unit 10B being incorporated in the refrigeration cycle apparatus 1.

A small amount of the refrigerant may be previously charged in the second heat source unit 10B. In this case, it is sufficient to regulate such that the total sum of the weight of the recovered refrigerant, the weight of the previously charged refrigerant, and, as necessary, the weight of the additional refrigerant is the gross weight of the refrigerants that is proper for the refrigeration cycle apparatus 1 after renewal.

(3-8) Modification 1H

Figure 8:
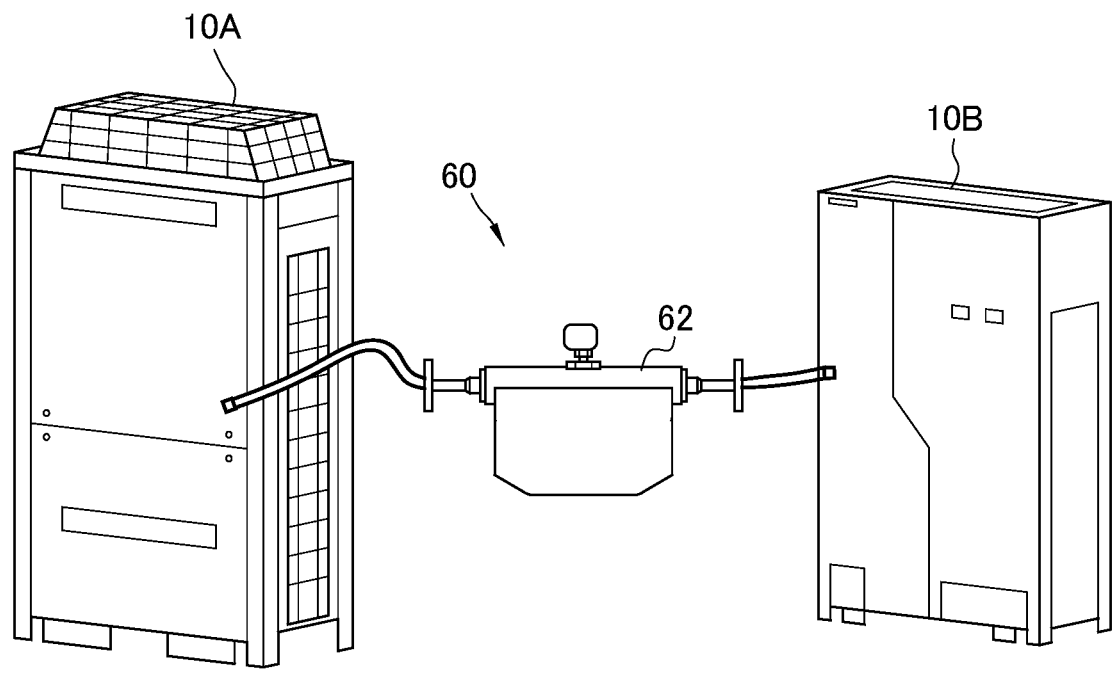
FIG. 8 is a schematic diagram for describing measurement of the weight of a refrigerant in a modification 1H.

In the embodiment and the modifications mentioned above, a case in which the scale 61 is used to measure the weight of the recovered refrigerant has been described; however, as illustrated in FIG. 8, a mass flow meter 62 may be used to measure the weight of the recovered refrigerant that is transferred from the first heat source unit 10A to the second heat source unit 10B. In this case, the mass flow meter 62 is included in the measurement system 60. The mass flow meter 62 is, for example, a Coriolis flow meter. Using the Coriolis flow meter makes it possible to measure the mass of the recovered refrigerant even when the refrigerant is transferred from the first heat source unit 10A to the second heat source unit 10B in a gas-liquid two-phase state. Considering that a difference of gravitational acceleration on the earth is minute, it is treated in the present disclosure that a measured value (kg) obtained by the mass flow meter 62 is nearly equal to the weight (kgf) of the recovered refrigerant. Measurement using the mass flow meter 62 can be performed in any of a case in which the refrigerant is transferred from the first heat source unit 10A to the second heat source unit 10B with the first heat source unit 10A connected to the power source 210, a case in which the refrigerant is transferred from the first heat source unit 10A to the second heat source unit 10B with the second heat source unit 10B connected to the power source 210, or a case in which the refrigerant is transferred from the first heat source unit 10A to the second heat source unit 10B via the recovery cylinder 80.

(3-9) Modification 1I

In the refrigerant charging method for the refrigeration cycle apparatus 1 described in the aforementioned embodiment, it is preferable to further include a step of, before recovering the refrigerant from the first heat source unit 10, operating the already installed refrigeration cycle apparatus 1 and heating the refrigerant in the refrigerant circuit 100.

(3-10) Modification 1J

Figure 9:
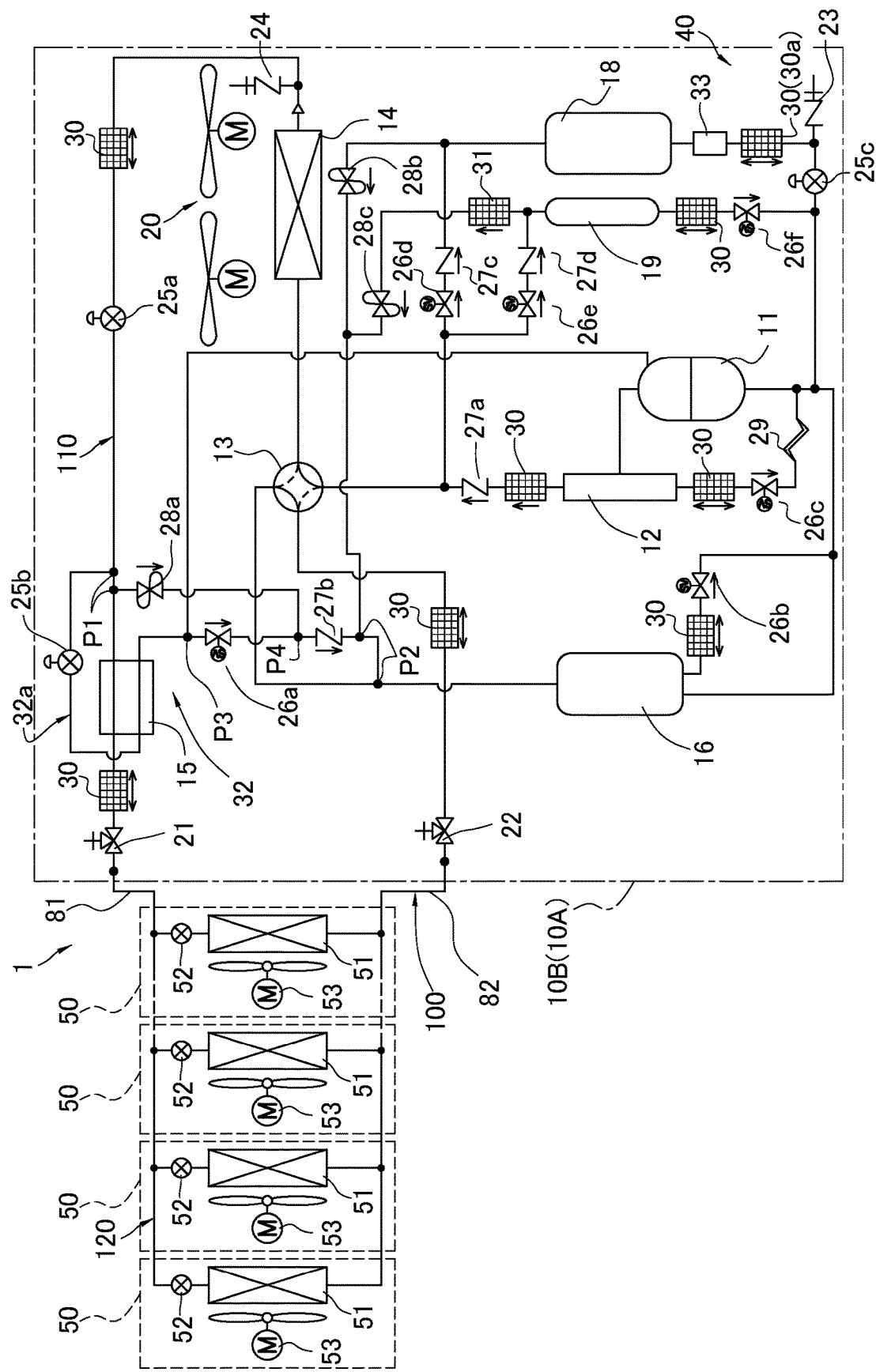
FIG. 9 is a refrigerant circuit diagram illustrating an outline of the configuration of a refrigeration cycle apparatus according to a modification 1J.

In the refrigeration cycle apparatus 1 illustrated in FIG. 9, a bypass 40 including the filter 30a and a dryer 33 is provided between the charge port 23 for the recovered refrigerant and the refrigerant regulator 18. The refrigeration cycle apparatus 1 may be configured to cause the recovered refrigerant to pass through such a bypass 40 and to be transferred to the heat-source-side circuit 110 of the second heat source unit 10B.

Figure 10:
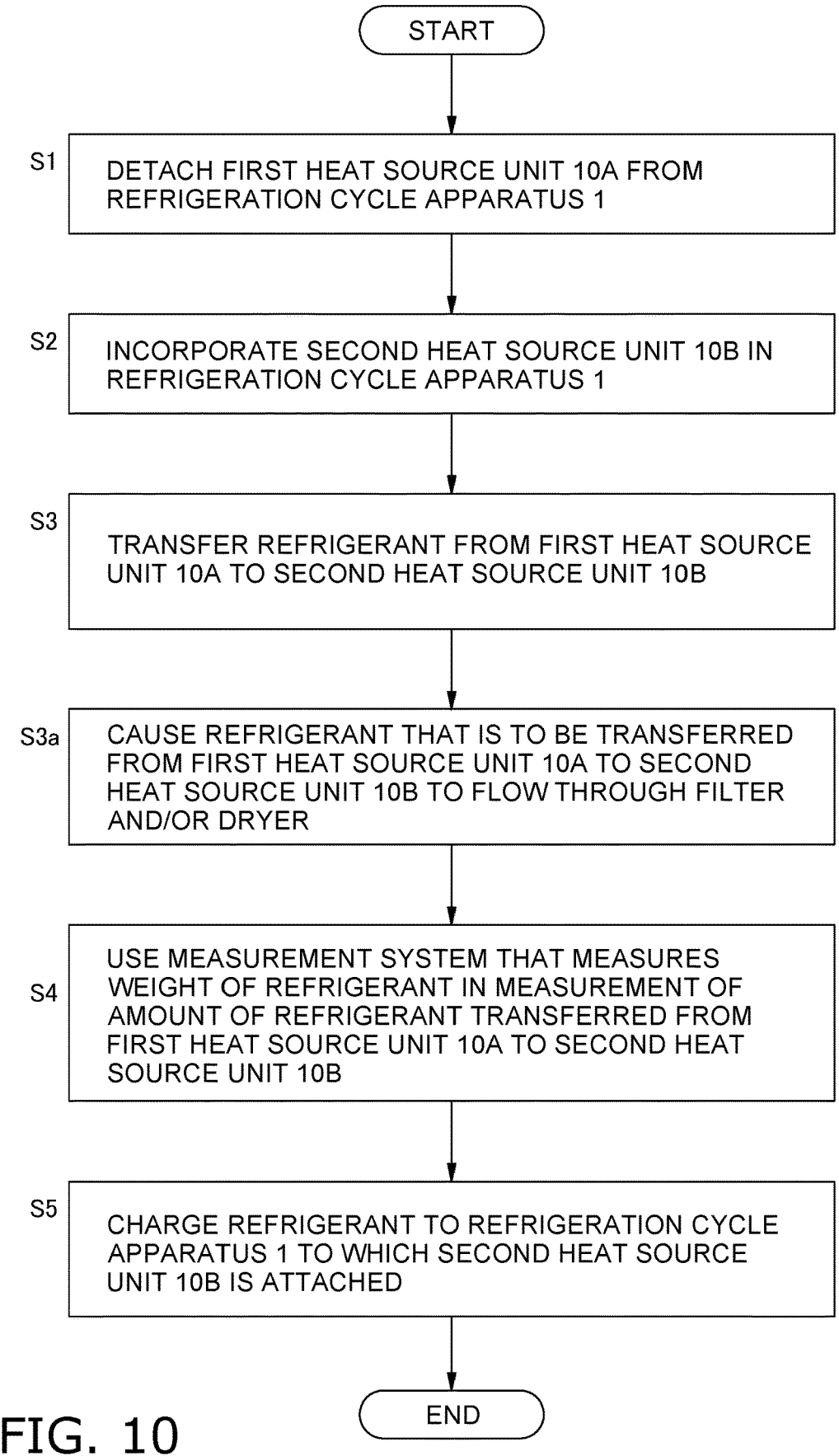
FIG. 10 is a flowchart illustrating an outline of a flow of a refrigerant charging method in the modification 1J.

In this case, as illustrated in FIG. 10, a step S3a of causing, when transferring the refrigerant from the first heat source unit 10A to the second heat source unit 10B, the refrigerant to flow through the filter 30a that removes a foreign material from the refrigerant and/or the dryer 33 that removes moisture from the refrigerant is added.

The above-described filter 30a and/or the dryer 33 may be provided at the charge hose 70 instead of being provided at the second heat source unit 10B. The order of the steps S3 and S3a may be reverse, or these steps S3 and S3a may be performed in parallel.

(3-11) Modification 1K

The refrigeration cycle apparatus 1 preferably includes an oxygen absorbent and/or an antioxidant before the refrigerant is transferred from the first heat source unit 10A to the second heat source unit 10B. In particular, when the same kind of refrigeration cycle apparatuses 1 that use the same kind of refrigerating machine oil, one of the apparatuses being compatible with the recovered refrigerant and the other being not compatible with the recovered refrigerant, are provided, a larger amount of the oxygen absorbent and/or the antioxidant is added to the refrigerating machine oil in the refrigeration cycle apparatus 1 of the type compatible with the recovered refrigerant than in the refrigeration cycle apparatus of the type not compatible with the recovered refrigerant. The oxygen absorbent and/or the antioxidant is added into the compressor 11, into the oil regulator 19, or into the refrigerant regulator 18 of the refrigeration cycle apparatus 1 that does not include the oil regulator 19.

(3-12) Modification 1L

In the aforementioned embodiment, a case in which each of the first heat source unit 10A and the second heat source unit 10B is provided with the subcooling heat exchanger 15 has been described; however, the first heat source unit 10A and/or the second heat source unit 10B may not be provided with the subcooling heat exchanger 15.

In addition, a case in which each of the first heat source unit 10A and the second heat source unit 10B is provided with the oil regulator 19 has been described; however, the first heat source unit 10A and/or the second heat source unit 10B may not be provided with the oil regulator 19.

In addition, a case in which each of the first heat source unit 10A and the second heat source unit 10B is provided with the refrigerant regulator 18 has been described; however, the first heat source unit 10A and/or the second heat source unit 10B may not be provided with the refrigerant regulator 18.

In addition, a case in which each of the first heat source unit 10A and the second heat source unit 10B is provided with the oil separator 12 has been described; however, the first heat source unit 10A and/or the second heat source unit 10B may not be provided with the oil separator 12.

(4) Features (4-1)

In the refrigerant charging method for the refrigeration cycle apparatus 1 of the aforementioned embodiment, the refrigerant of the first heat source unit 10A is recovered to be charged to the second heat source unit 10B. The weight of the refrigerant transferred from the first heat source unit 10A to the second heat source unit 10B is measured, and thus, the weight of the recovered refrigerant that can be charged again from the first heat source unit 10A to the refrigeration cycle apparatus 1 to which the second heat source unit 10B is attached is known. Moreover, since the weight of the circulating refrigerant required for the refrigeration cycle apparatus 1 that includes the second heat source unit 10B can be previously obtained, for example, as a design value, it is possible to precisely know the weight of the lacking refrigerant from a difference between the design value and the weight of the measured recovered refrigerant.

Accordingly, it is possible to charge a proper amount of the refrigerant from the first heat source unit 10A to the second heat source unit 10B. Thus charging the recovered refrigerant to the second heat source unit 10B saves, for example, time and labor of carrying the refrigerant recovered in the first heat source unit 10A to a factory, as has been performed conventionally, and/or time and labor of carrying the refrigerant from the factory to the second heat source unit 10B. As a result, according to the refrigerant charging method described above, it is possible to efficiently charge the recovered refrigerant from the first heat source unit to the second heat source unit.

(4-2)

In the refrigerant charging method for the refrigeration cycle apparatus 1 described in the aforementioned modification 1F, the weight of the recovered refrigerant is measured by the scale 61 from the weight of the recovery cylinder 80 in which the refrigerant has been recovered from the first heat source unit 10A. For example, it is possible to measure the weight of the recovery cylinder 80 that is before and after the recovery of the recovered refrigerant from the first heat source unit 10A to the recovery cylinder 80, or it is possible to measure the weight of the recovery cylinder 80 that is before and after the transfer of the refrigerant from the recovery cylinder 80 to the second heat source unit 10B. As a result, it is possible to precisely measure the amount of the recovered refrigerant that is transferred from the first heat source unit 10A to the second heat source unit 10B via the recovery cylinder 80.

(4-3)

In the refrigerant charging method for the refrigeration cycle apparatus 1 according to the aforementioned embodiment, the weight of the first heat source unit 10A that is after a recovery object refrigerant is recovered in the first heat source unit 10A through pump down operation is measured by the scale 61. For example, it is possible to measure the weight of the first heat source unit 10A that is before and after the refrigerant is sent out from the first heat source unit 10A, and it is possible to precisely measure the amount of the recovered refrigerant that is transferred from the first heat source unit 10A to the second heat source unit 10B.

(4-4)

In the refrigerant charging method for the refrigeration cycle apparatus 1 described in the aforementioned modification 1H, the mass of the refrigerant that flows from the first heat source unit 10A to the second heat source unit 10B is measured by the mass flow meter 62, and it is thus possible to directly measure, with precision, the amount of the recovered refrigerant that is transferred from the first heat source unit 10A to the second heat source unit 10B. When the mass flow meter 62 is used, there is no need to place the first heat source unit 10A, the second heat source unit 10B, or the recovery cylinder 80, which is heavy, on the scale 61, and the work load of an operator is thus reduced, compared with when the scale 61 described above is used.

(4-5)

In the refrigerant charging method for the refrigeration cycle apparatus 1 described in the aforementioned modification 1G, the weight of the second heat source unit 10B to which the recovered refrigerant has been transferred from the first heat source unit 10A is measured by the scale 61. Thus, for example, it is possible to measure the weight of the second heat source unit 10B that is before and after the recovered refrigerant is transferred to the second heat source unit 10B, and it is possible to precisely measure the amount of the recovered refrigerant that is transferred from the first heat source unit 10A to the second heat source unit 10B.

(4-6)

As described in the aforementioned modification 1J, when the recovered refrigerant is to be transferred from the first heat source unit 10A to the second heat source unit 10B, the refrigerant is caused to flow through the filters 30 and/or the dryer 33, and it is thus possible to remove a foreign material and/or moisture from the recovered refrigerant that is to be transferred from the first heat source unit 10A to the second heat source unit 10B.

(4-7)

The filters 30 and/or the dryer 33 described in the aforementioned modification 1J is disposed in the bypass 40 in which the refrigerant does not flow during the normal operation of the refrigeration cycle apparatus 1. While it is possible to remove a foreign material and/or moisture by transferring the recovered refrigerant through the bypass 40 in which the filters 30 and/or the dryer 33 is disposed, it is possible by causing the refrigerant not to pass through the bypass 40 during normal operation to suppress an increase of flow path resistance and an increase of energy loss.

(4-8)

As described in the aforementioned modification 1K, when the second heat source unit 10B includes the antioxidant and/or the oxygen absorbent before the recovered refrigerant is transferred from the first heat source unit 10A to the second heat source unit 10B, it is possible by only transferring the refrigerant to the second heat source unit 10B to activate the antioxidant and/or the oxygen absorbent and to save time and labor in the renewal of the refrigeration cycle apparatus 1.

(4-9)

When the already installed refrigeration cycle apparatus 1 is operated to heat the refrigerant before the refrigerant is recovered from the first heat source unit 10A, it is possible to separate oil dissolved in the refrigerant and to reduce oil included in the recovered refrigerant recovered from the first heat source unit 10A.

An embodiment of the present disclosure has been described above; however, it should be understood that various changes in the forms and details are possible without deviating from the gist and the scope of the present disclosure described in the claims.

REFERENCE SIGNS LIST 1 refrigeration cycle apparatus
10A first heat source unit
10B second heat source unit
30a filter
33 dryer
40 bypass
60 measurement system
61 scale
62 mass flow meter
80 recovery cylinder

CITATION LIST

Patent Literature

PTL 1: Japanese Unexamined Patent Application Publication No. 2003-240388

The invention claimed is:
1. A refrigerant charging method of recovering a refrigerant from a first heat source unit and charging the recovered refrigerant to a second heat source unit, the refrigerant being included in the first heat source unit of an already installed refrigeration cycle apparatus in which a refrigeration cycle is to be performed by the refrigerant that circulates, the method comprising:
- (a) transferring the recovered refrigerant from the first heat source unit to the second heat source unit, the first heat source unit including a first compressor for discharging refrigerant to circulate refrigerant and perform a refrigeration cycle, and a first heat source side heat exchanger, and the second heat source unit including a second compressor for discharging refrigerant to circulate refrigerant and perform a refrigeration cycle, and a second heat source side heat exchanger, and
- (b) measuring a weight of the refrigerant that is transferred from the first heat source unit to the second heat source unit, wherein the refrigerant charging method further comprising:

providing the first heat source unit with a service port of a high-pressure-side shutoff valve, and providing the second heat source unit with a charge port, and wherein step (b) includes connecting the service port of the high-pressure side shut-off valve of the first heat source unit to a charge port of the second heat source unit with a charge hose.

2. The refrigerant charging method according to claim 1, wherein, in (b), the weight of the refrigerant that is transferred from the first heat source unit to the second heat source unit is measured by using a mass flow meter that measures a mass of the refrigerant that flows from the first heat source unit to the second heat source unit.

3. The refrigerant charging method according to claim 2, further comprising:

causing the refrigerant, when transferring the refrigerant from the first heat source unit to the second heat source unit, to flow through a filter that removes a foreign material from the refrigerant and/or a dryer that removes moisture from the refrigerant.

4. The refrigerant charging method according to claim 2, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

5. The refrigerant charging method according to claim 1, further comprising:

causing the refrigerant, when transferring the refrigerant from the first heat source unit to the second heat source unit, to flow through a filter that removes a foreign material from the refrigerant and/or a dryer that removes moisture from the refrigerant.

6. The refrigerant charging method according to claim 5, wherein the filter and/or the dryer is disposed in a bypass in which the refrigerant does not flow during normal operation of the refrigeration cycle apparatus.

7. The refrigerant charging method according to claim 6, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

8. The refrigerant charging method according to claim 5, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

9. The refrigerant charging method according to claim 1, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

10. The refrigerant charging method according to claim 1, further comprising:

heating the refrigerant by operating the already installed refrigeration cycle apparatus before recovering the refrigerant from the first heat source unit.

11. The refrigerant charging method according to claim 1, wherein, in (a), the recovered refrigerant is directly transferred from the first heat source unit to the second heat source unit.

12. A refrigerant charging method of recovering a refrigerant and charging the refrigerant to a second heat source unit, the refrigerant being included in a first heat source unit of an already installed refrigeration cycle apparatus in which a refrigeration cycle is to be performed by the refrigerant that circulates, the method comprising:
- (a) transferring the refrigerant from the first heat source unit to the second heat source unit; and
- (b) measuring a weight of the refrigerant that is transferred from the first heat source unit to the second heat source unit, wherein, in (b), the weight of the refrigerant that is transferred from the first heat source unit to the second heat source unit is measured by using a scale that measures a weight of the first heat source unit that is after the refrigerant is recovered in the first heat source unit through pump down operation that is performed to cause the refrigerant of the already installed refrigeration cycle apparatus to be recovered in the first heat source unit.

13. The refrigerant charging method according to claim 12, further comprising:

causing the refrigerant, when transferring the refrigerant from the first heat source unit to the second heat source unit, to flow through a filter that removes a foreign material from the refrigerant and/or a dryer that removes moisture from the refrigerant.

14. The refrigerant charging method according to claim 12, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

15. A refrigerant charging method of recovering a refrigerant and charging the refrigerant to a second heat source unit, the refrigerant being included in a first heat source unit of an already installed refrigeration cycle apparatus in which a refrigeration cycle is to be performed by the refrigerant that circulates, the method comprising:
- (a) transferring the refrigerant from the first heat source unit to the second heat source unit; and
- (b) measuring a weight of the refrigerant that is transferred from the first heat source unit to the second heat source unit, wherein, in (b), the weight of the refrigerant that is transferred from the first heat source unit to the second heat source unit is measured by using a scale that measures a weight of the second heat source unit in which the refrigerant has been transferred from the first heat source unit.

16. The refrigerant charging method according to claim 15, further comprising:

causing the refrigerant, when transferring the refrigerant from the first heat source unit to the second heat source unit, to flow through a filter that removes a foreign material from the refrigerant and/or a dryer that removes moisture from the refrigerant.

17. The refrigerant charging method according to claim 15, wherein the second heat source unit includes, before the refrigerant is transferred from the first heat source unit to the second heat source unit, an antioxidant and/or an oxygen absorbent that exerts an effect in a flow path of the refrigerant that circulates in the refrigeration cycle apparatus.

* * * * *